(12) United States Patent
Van der Walt et al.

(10) Patent No.: US 11,484,829 B1
(45) Date of Patent: Nov. 1, 2022

(54) METHODS, SYSTEMS, AND DEVICES FOR FLUE GAS COOLING FOR CARBON CAPTURE PROCESSES

(71) Applicant: NEXT Carbon Solutions, LLC, Houston, TX (US)

(72) Inventors: Ivan Van der Walt, Conroe, TX (US); Ben Heichelbech, Houston, TX (US); Alex Thompson, Sugar Land, TX (US); Connor Rivard, Houston, TX (US); Victor Fernandes, Katy, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 17/737,909

(22) Filed: May 5, 2022

Related U.S. Application Data

(60) Provisional application No. 63/188,246, filed on May 13, 2021.

(51) Int. Cl.
| | | |
|---|---|---|
| *B01D 53/34* | (2006.01) | |
| *B01D 53/62* | (2006.01) | |
| *B01D 53/78* | (2006.01) | |

(52) U.S. Cl.
CPC ........... *B01D 53/343* (2013.01); *B01D 53/62* (2013.01); *B01D 53/78* (2013.01); *B01D 2257/504* (2013.01); *B01D 2258/0283* (2013.01); *B01D 2259/652* (2013.01)

(58) Field of Classification Search
CPC .... B01D 53/14; B01D 53/1475; B01D 53/34; B01D 53/62; B01D 53/78; B01D 5/00; B01D 5/0003; B01D 5/0015; B01D 5/0027; B01D 5/0075; F28B 3/00; F28B 9/00; F28C 1/00; F28C 3/00; F28C 3/02; F28C 2001/006; F28D 1/03; F28D 2021/0024

See application file for complete search history.

(56) References Cited

U.S. PATENT DOCUMENTS

| | | | | |
|---|---|---|---|---|
| 3,653,810 | A  * | 4/1972 | Bratzler ................. | B01D 53/62 95/174 |
| 2010/0083831 | A1* | 4/2010 | Gal ........................ | B01D 53/62 95/232 |
| 2019/0160422 | A1* | 5/2019 | Murai .................... | B01D 53/62 |
| 2021/0245092 | A1* | 8/2021 | Liu ......................... | C01B 32/50 |

FOREIGN PATENT DOCUMENTS

| | | | | |
|---|---|---|---|---|
| GB | 2 454 266 A | * | 5/2009 | ............. B01D 53/62 |

* cited by examiner

*Primary Examiner* — Timothy C Vanoy
(74) *Attorney, Agent, or Firm* — K&L Gates LLP

(57) ABSTRACT

A flue gas can be cooled for carbon capture purposes with the use of a gas-to-gas exchanger, using air as the cooling media, downstream of a heat recovery process, and optionally upstream of a quenching process; the use of an amine chilling process to reduce the required flue gas cooling duties upstream of the $CO_2$ absorber; the use of a gas-to-gas exchanger, using the absorber overhead as the cooling media, downstream of a heat recovery process, and optionally upstream of the quenching process; and/or the use of a quenching process in which heated water and condensate is cooled by an external cooling loop utilizing treated flue gas condensate in an evaporative cooling process.

27 Claims, 5 Drawing Sheets

METHODS, SYSTEMS, AND DEVICES FOR FLUE GAS COOLING FOR CARBON CAPTURE PROCESSES

CROSS REFERENCE TO RELATED APPLICATIONS

The present application claims the benefit of priority to U.S. Provisional Application No. 63/188,246 filed May 13, 2021, the entirety of which is incorporated herein by reference.

BACKGROUND

In post-combustion carbon capture units, carbon dioxide ($CO_2$) is separated from the flue gas via an absorbing media. $CO_2$ Absorber Columns in these units must operate at temperature conditions in the range of 100° F. to 150° F. to enable effective absorption and to prevent accelerated degradation of the absorbing media which is exposed to oxygen and other contaminants in the flue gas.

The $CO_2$ laden flue gas streams from various industrial processes achieve post-combustion temperatures ranging from 175° F. to 1500° F. These streams must be cooled prior to contact with the absorbing media in the $CO_2$ absorber. Flue gas streams are typically cooled using a combination of heat recovery either for power generation or cogeneration followed by a quenching process with a freshwater cooling loop. Cooling water systems can be costly and typically require significant amounts of fresh-water make-up, placing a significant demand on utilities and local fresh-water sources.

SUMMARY

According to a non-limiting aspect of the present disclosure, which may be combined with any other aspect listed herein unless specified otherwise, a process of flue gas cooling for carbon capture purposes may comprise the use of a gas-to-gas exchanger, using air as the cooling media, downstream of a heat recovery process and upstream of a quenching process.

According to a non-limiting aspect of the present disclosure, which may be combined with any other aspect listed herein unless specified otherwise, a process of flue gas cooling for carbon capture purposes may comprise the use of a gas-to-gas exchanger, using air as the cooling media, downstream of a heat recovery process.

According to another non-limiting aspect of the present disclosure, which may be combined with any other aspect listed herein unless specified otherwise, a process of flue gas cooling for carbon capture purposes may comprise the use of an amine chilling process to reduce the required flue gas cooling duties upstream of the $CO_2$ absorber.

According to a non-limiting aspect of the present disclosure, which may be combined with any other aspect listed herein unless specified otherwise, a process of flue gas cooling for carbon capture purposes may comprise the use of a gas-to-gas exchanger, using air as the cooling media, downstream of a heat recovery process and upstream of a quenching process, and the use of an amine chilling process to reduce the required flue gas cooling duties upstream of the $CO_2$ absorber.

According to a non-limiting aspect of the present disclosure, which may be combined with any other aspect listed herein unless specified otherwise, a process of flue gas cooling for carbon capture purposes may comprise the use of a quenching process in which the heated water and condensate thereof is cooled by an external cooling loop utilizing treated flue gas condensate in an evaporative cooling process.

DETAILED DESCRIPTION

Figure 1:
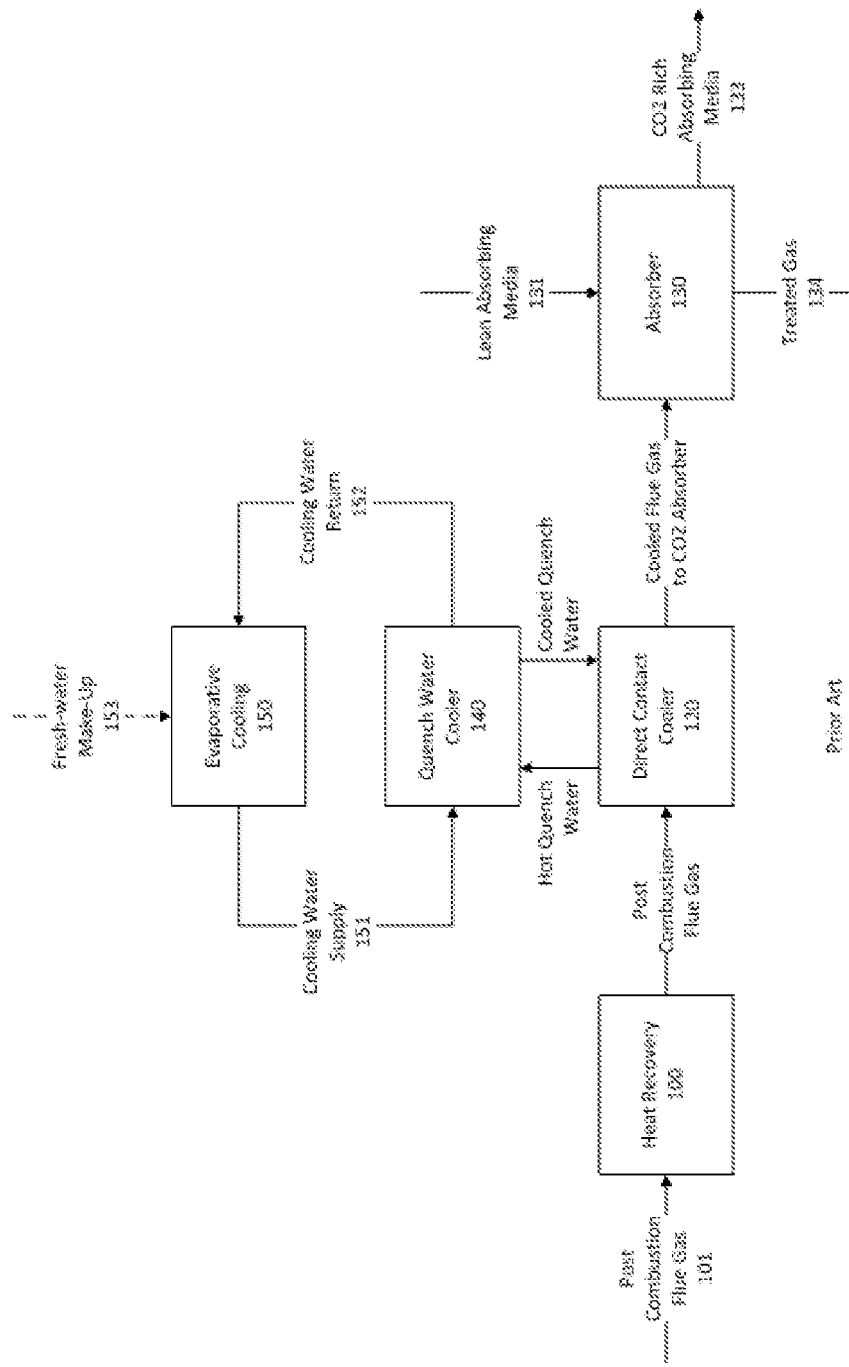
FIG. 1 illustrates prior art flue gas cooling processes for $CO_2$ capture.

As illustrated in FIG. 1, conventionally, post-combustion flue gas streams 101 are typically cooled using a combination of heat recovery 100 either for power generation or cogeneration followed by a direct contact cooler process 120 with a freshwater cooling loop cooled using an evaporative cooling process 150. Evaporative cooling water processes 150 can be costly and typically require large amounts of fresh-water make-up 153 which can place a significant demand on local utilities and fresh-water sources.

Combustion flue gas 101 from various combustion processes can achieve post-combustion temperatures ranging from 175° F. to 1500° F. The flue gas is primarily composed of a mixture of nitrogen, oxygen, carbon-dioxide, and water. Additional products of combustion include SOx and NOx which are general representations of Sulfur and Nitrogen Oxides respectively. The presence and levels of additional contaminants in the flue gas (e.g. Sulfur, Chlorine, Bromine, etc.) is based on the relative levels of those contaminants in the fuel source. Flue gases also contain particulate matter.

A heat recovery process 100 is typically utilized for cogeneration, combined-cycle, or to increase combustion efficiency (e.g. air pre-heating). Heat Recovery Steam Generation (HRSG) units are commonly used for both cogeneration and combined-cycle applications. Other media, aside from liquid water and steam, can be used for heat recovery (e.g. hot oil). Air-preheaters are another heat recovery process used to pre-heat combustion air to increase efficiency in certain combustion systems. In a typical heat recovery process 100, the desired heat recovery from the flue gas stream is specified based on process requirements (i.e. cogeneration), electricity production potential (i.e. combined-cycle), and limiting factors such as the acid gas dew point of the flue gas stream. Heat recovery 100 can reduce flue gas temperatures to a range of 300° F. to 175° F.

The direct contact cooler (DCC) 120 utilizes a quenching process in which a cooling media, typically water, is sprayed directly into the flue gas stream to provide rapid heat transfer. The flue gas stream becomes saturated with the cooling media, and condensate (water, unburned hydrocarbons, etc.) from the flue gas stream will drop out in the DCC.

The heated water and condensate from the bottom of the DCC is cooled by an external cooling loop, typically in the form of a fresh-water cooling loop with evaporative cooling. The cooled cooling media is then circulated back the top of the DCC.

Cooling water is utilized to cool the cooling media used in the DCC 120, typically via a liquid-to-liquid exchanger. Heated cooling water from this exchanger is sent to an evaporative cooling process 150, where a portion of the water evaporates. The evaporative process allows the cooling water to be cooled to near the wet-bulb temperature, and the cooled water is pumped back to cool the quenching water. Additional cooling water is rejected from the system as blowdown water. The rate of blowdown is used to control the concentration of contaminants in the cooling water system.

Fresh-water make-up 153 is provided to the cooling water system to replenish the water that has evaporated or been blowdown. Fresh-water make-up requirements can be cost prohibitive or unavailable based on the local availability of fresh-water.

The absorbing media used in absorber to capture $CO_2$ can be ammonia, amine based, carbonate based (e.g. potassium carbonate), and mixtures thereof. The lean absorbing media 131 refers to the absorbing media prior to contact with the flue gas stream. This stream is $CO_2$ lean. The rich absorbing media 133 refers to the absorbing media after contact with the flue gas stream. This stream is $CO_2$ rich.

The absorber 130 is a contactor where lean absorbing media 131 is brought into contact with flue gas 101. $CO_2$ in the flue gas 101 is absorbed into the lean absorbing media 131. The $CO_2$ rich absorbing media 133 is then pumped to another process to regenerate the absorbing media (desorption of the $CO_2$). The flue gas stream 101, which has been stripped of $CO_2$, leaves the top of the absorber as treated gas 134.

The treated gas 134 is the flue gas stream after having some or all of its $CO_2$ removed (based on the $CO_2$ capture performance of the process). It is primarily composed of nitrogen, oxygen, and water. The temperature of the treated gas 180 is typically between 100° F. to 140° F. and leaves the absorber at atmospheric pressure.

The present disclosure provides novel processes, apparatuses, and systems that can be used individually or in combination to optimize utility costs associated with the cooling of post-combustion flue gas.

Figure 2:
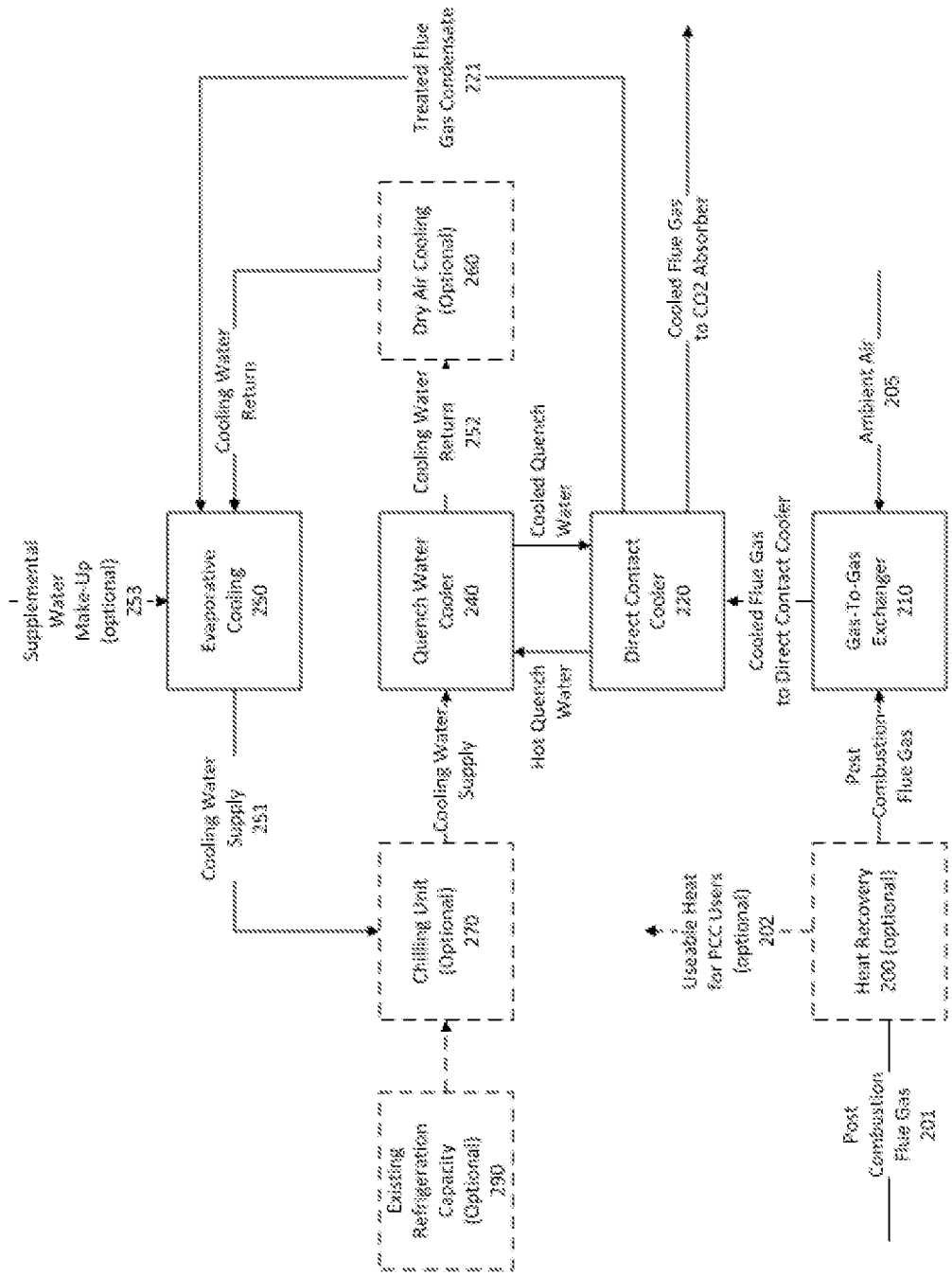
FIG. 2 illustrates a flue gas cooling process that includes a gas-to-gas exchanger between the heat recovery process and quench process according to an aspect of the present disclosure.

In another embodiment, as shown in FIG. 2, a gas-to-gas exchanger 210 with air as the cooling media may be added downstream of the heat recovery process 200 and upstream of the DCC 220. The DCC 220 here is the same as the DCC 120. The embodiment shown in FIG. 2 does not negatively impact the performance of the absorber (not shown), resulting in treated gas and $CO_2$ rich absorbing media (not shown) with similar compositions to the treated gas 134 and $CO_2$ rich absorbing media 133 from prior art.

The gas-to-gas exchanger 210 can be plate or rotary type exchangers. Air-preheaters, used to pre-heat combustion air using waste-heat from the flue gas, are an example of gas-to-gas exchangers often used in multiple industries to increase boiler efficiency.

Ambient air 205 may be provided via one or more fans or blowers through the gas-to-gas exchanger 210 to further reduce the flue gas temperature prior to introduction into the DCC 220.

Any additional reduction in flue gas temperatures upstream of the DCC 220 will result in reduction in the demand on the evaporative cooling process 250. The reduction in demand reduces the rate of evaporative and blowdown losses from the cooling water system, saving water. For example, a typical quench process may require the cooling of flue gas from approximately 250° F. to 100° F. In this example, if the addition of a gas-to-gas exchanger results in a quench flue gas inlet temperature of 130° F., a significant reduction in cooling duty is required, and therefore water consumption will decrease. In addition to savings associated with operating costs (e.g. water make-up rates and pump circulation requirements), capital cost savings associated with the quench process can be realized (e.g. smaller quench tower, smaller/fewer pumps, fewer cooling tower bays, etc.).

The addition of a gas-to-gas exchanger 210 to reduce the cooling duty required in the DCC 220 has no impact on the flue gas conditions at the inlet of the absorber (not shown), and therefore no impact on the performance of the absorber or composition of the treated gas (not shown) in comparison to the process shown in FIG. 1.

For facilities in which there is limited or no available external water for consumption in the evaporative cooling process 250, the treated flue gas condensate 221 can be utilized. Post-combustion flue gas 201 is typically 7-20% water by volume, which will result in water condensate when the post-combustion flue gas 201 is cooled below is water dew-point. This condensate can be treated and utilized within the cooling water system. In extreme cases, this treated flue gas condensate 221 can be the sole source of water for the cooling water system. If additional water is available, supplemental water make-up 253 can be another source of cooling water make-up.

The post-combustion flue gas stream 201 may have heat that is useable for the carbon capture process (e.g. for absorbing media regeneration), that was not useful for an existing facility from which it is sourced, and was therefore not recovered. An optional heat recovery process 200 can be implemented to provide useful heat for carbon capture process users and to reduce the flue gas temperature further, reducing the required duties for downstream cooling equipment.

In order to further reduce water consumption within the evaporative cooling process, an optional dry air cooling process 260 can be implemented on the cooling water return 252 to the evaporative cooling process 250. In this arrangement, the dry air cooling process 260 shifts duty away from the evaporative cooling process 250, especially under conditions where cool dry-bulb temperatures (<80° F.) exist. This arrangement can be designed to operate fully dry (no duty on evaporative cooler 250) at certain ambient conditions, and only rely on the evaporative cooling process 250 when dry-bulb temperatures exceed minimum process requirements.

For processes in which the optimal performance of the $CO_2$ absorbing media is below temperatures that can be practically achieved with an evaporative cooling process 250, an optional chilling unit 270 can added downstream of the evaporative cooling process 250 to further reduce the cooling water supply 251 temperature. In instances where the carbon capture facility is co-located with a facility with existing excess refrigeration capacity 290 (e.g. in an LNG liquefaction facility), this excess capacity can be utilized as the cooling media in the chilling unit 270.

As an additional alternative, the cooling water system can be designed such that the quenching water in the DCC 220 and the cooling water are one and the same. In this configuration, the warm quenching water is directly sent to the evaporative cooling process 250 where it is cooled and returned to the DCC 220. The quench water cooler 240 is not necessary and is removed. This configuration provides the benefit of reduced equipment count and larger approach temperatures in both the evaporative cooling process 250 and/or the optional dry air cooling process 260. In a still further embodiment, lean absorbing media may be utilized as the cooling media in the DCC 220.

Figure 3:
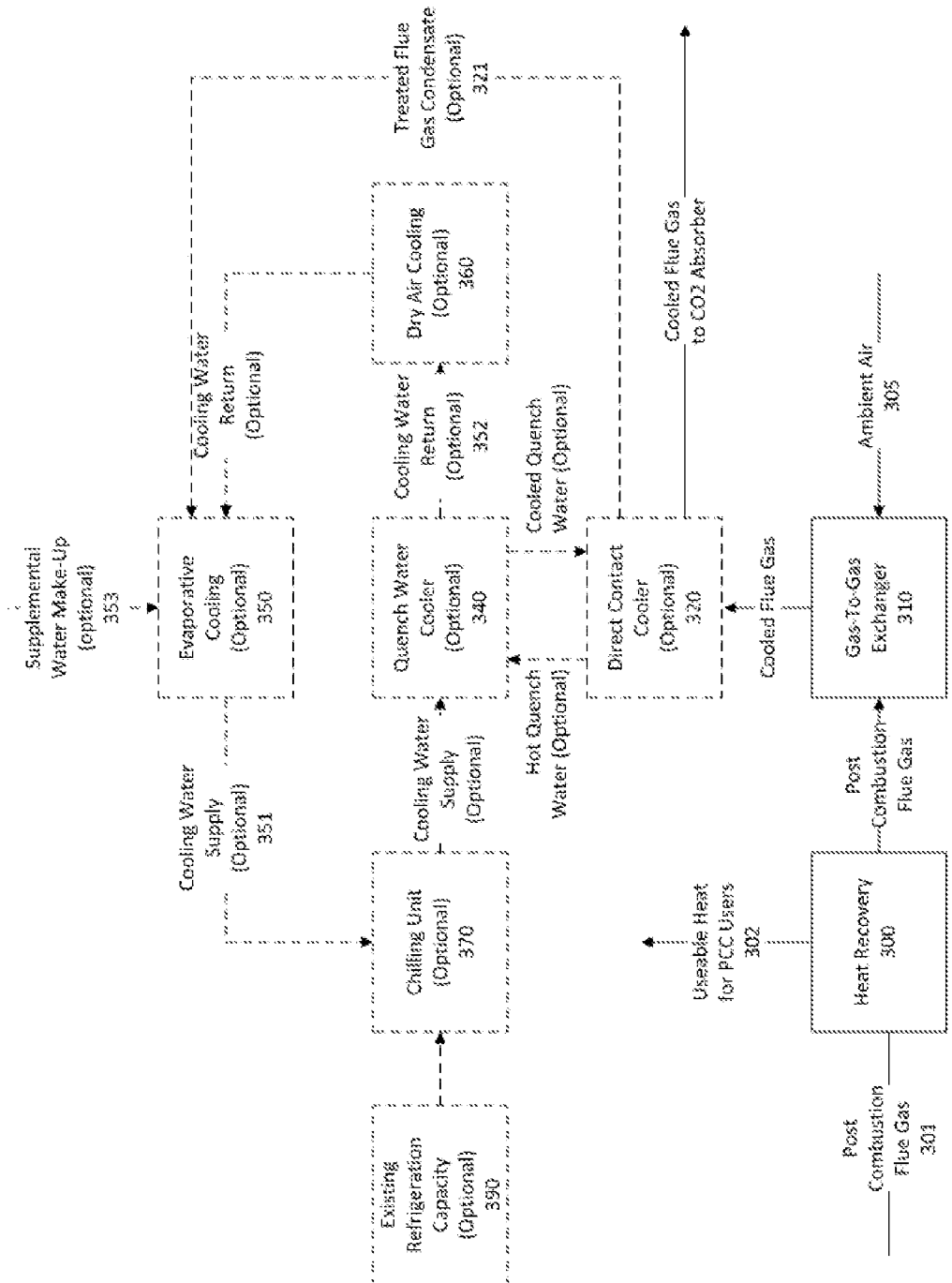
FIG. 3 illustrates a flue gas cooling process that includes a gas-to-gas exchanger between the heat recovery process and the $CO_2$ absorber according to an aspect of the present disclosure.

In another embodiment, as shown in FIG. 3, a gas-to-gas exchanger 310 with air as the cooling media may be added downstream of the heat recovery process 300 and upstream of the $CO_2$ absorber (not shown). In some applications, the gas-to-gas exchanger 310 will be sufficient to provide 100% of the required cooling duty for the post-combustion flue gas 301.

Example applications in which this design is practical are those in which local dry bulb temperatures are low enough to provide sufficient approach temperatures in the gas-to-gas exchanger 310. Evaporative cooling, which relies on the wet-bulb temperature, is not required. The concentration of water in the post-combustion flue gas 301 is another significant factor when evaluating the practicality of this configuration. Low water concentrations (~7% by volume) will reduce or eliminate latent heat transfer due to condensation, which in turn reduces the required surface area for the gas-to-gas exchanger 310.

Ambient air 305 may be provided via one or more fans or blowers through the gas-to-gas exchanger 310.

The post-combustion flue gas stream 301 may have heat that is useable for the carbon capture process (e.g. for absorbing media regeneration), that was not useful for an existing facility from which it is sourced, and was therefore not recovered. A heat recovery process 300 is included to provide useful heat for carbon capture process users and to reduce the flue gas temperature further, reducing the required duties for downstream cooling equipment.

In processes in which the gas-to-gas exchanger 310 cannot practically provide the required cooling duty for the post-combustion flue gas 301, a DCC 320 can be added downstream of the gas-to-gas exchanger 310. The DCC is cooled via an external evaporative cooling process 350, which can achieve lower temperatures than a dry air cooled system as an evaporative cooling process's cooling potential is based on the ambient wet-bulb temperature.

For facilities in which there is limited or no available external water for consumption in the evaporative cooling process 350, the treated flue gas condensate 321 can be utilized. Post-combustion flue gas 301 is typically 7-20% water by volume, which will result in water condensate when the post-combustion flue gas 301 is cooled below is water dew-point. This condensate can be treated and utilized within the cooling water system. In extreme cases, this treated flue gas condensate 321 can be the sole source of water for the cooling water system. If additional water is available, supplemental water make-up 353 can be another source of cooling water make-up.

In order to further reduce water consumption within the evaporative cooling process, an optional dry air cooling process 360 can be implemented on the cooling water return 352 to the evaporative cooling process 350. In this arrangement, the dry air cooling process 360 shifts duty away from the evaporative cooling process 350, especially under conditions where cool dry-bulb temperatures (<80° F.) exist. This arrangement can be designed to operate fully dry (no duty on evaporative cooler 350) at certain ambient conditions, and only rely on the evaporative cooling process 350 when dry-bulb temperatures exceed minimum process requirements.

For processes in which the optimal performance of the $CO_2$ absorbing media is below temperatures that can be practically achieved with an evaporative cooling process 350, an optional chilling unit 370 can added downstream of the evaporative cooling process 350 to further reduce the cooling water supply 351 temperature. In instances where the carbon capture facility is co-located with a facility with existing excess refrigeration capacity 390 (e.g. in an LNG liquefaction facility), this excess capacity can be utilized as the cooling media in the chilling unit 370.

As an additional alternative, the cooling water system can be designed such that the quenching water in the DCC 320 and the cooling water are one and the same. In this configuration, the warm quenching water is directly sent to the evaporative cooling process 350 where it is cooled and returned to the DCC 320. The quench water cooler 340 is not necessary and is removed. This configuration provides the benefit of reduced equipment count and larger approach temperatures in both the evaporative cooling process 350 and/or the optional dry air cooling process 360.

Figure 4:
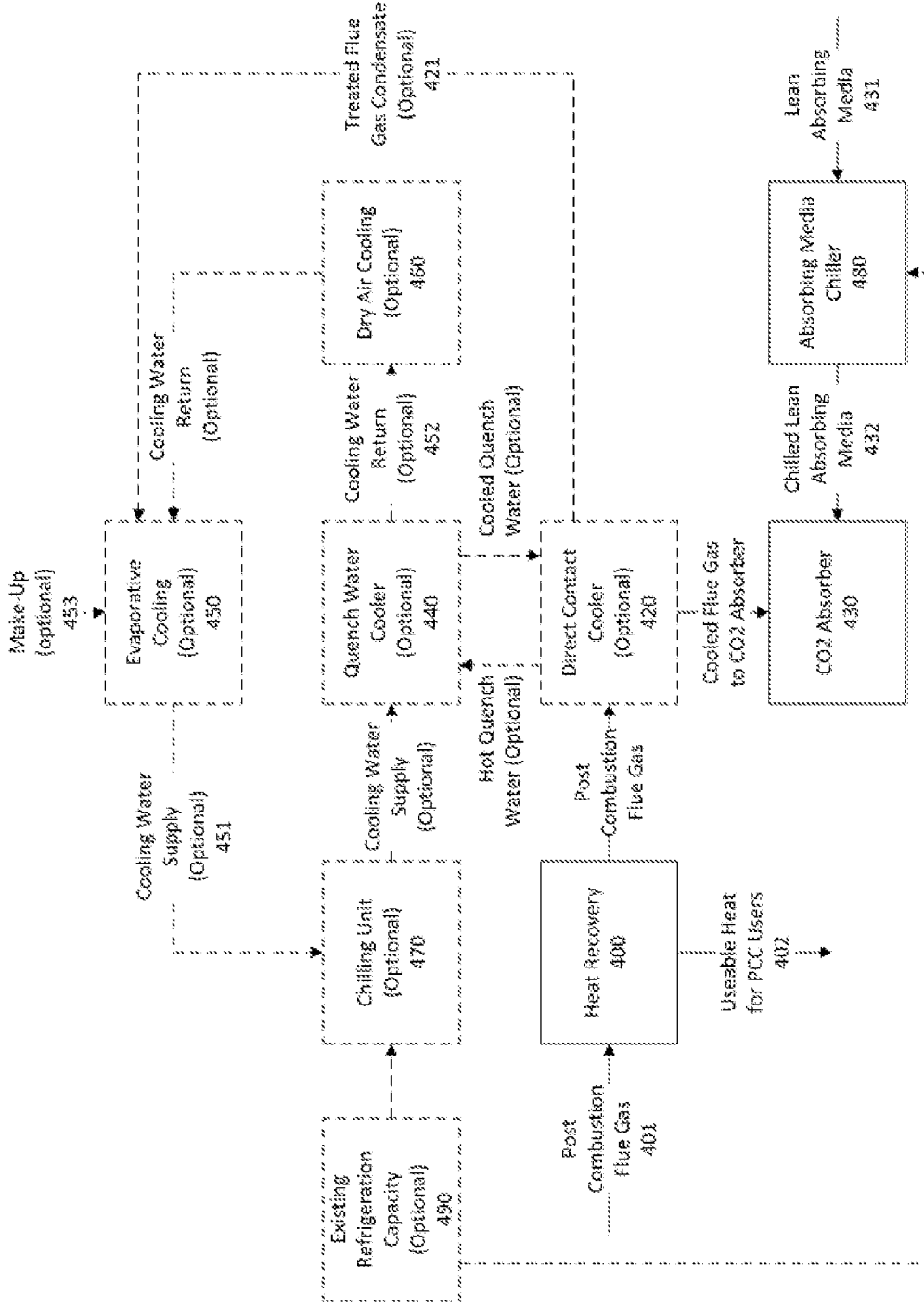
FIG. 4 illustrates a flue gas cooling process that includes a heat recovery process and an absorbing media chiller according to an aspect of the present disclosure.

In another embodiment, as shown in FIG. 4, an absorbing media chiller 480 may be added to chill the lean absorbing media 431 to meet the required operating temperature ranging from 100° F. to 200° F. of the $CO_2$ absorber 430. This embodiment does not negatively impact the performance of the absorber 430, resulting in treated gas and $CO_2$ rich absorbing media with similar compositions to the treated gas 134 and $CO_2$ rich absorbing media 133 from prior art.

The absorbing media chiller 480 is an exchanger (e.g. shell and tube, plate, etc.) in which the lean absorbing media 431 is cooled below the normal operating temperature of the absorber and below the dry-bulb temperature of the surrounding air. The cooling media in the absorbing media chiller 480 can be chilled water that is cooled via a refrigeration cycle, or the cooling media can be the refrigerant in a refrigeration cycle (e.g. propane).

In this process, higher temperatures (up to 175° F.) are permitted at the flue gas inlet of the $CO_2$ absorber, as additional flue gas cooling will occur via direct contact with the chilled lean absorbing media 432 in the $CO_2$ absorber 430. Sufficient chilling is provided such that when the absorbing media is mixed with the flue gas in the absorber, the absorbing media remains within the acceptable operating temperatures of the $CO_2$ absorber 430.

In this scheme, flue gas cooling duty is shifted from cooling upstream of the $CO_2$ absorber 430 to direct contact in the $CO_2$ absorber 430 with chilled lean absorbing media 432.

Existing refrigeration capacity 490 within a co-located facility can be used to cool the absorbing media in the absorbing media chiller. Existing refrigeration capacity 490 may comprise of a refrigeration loop (e.g. Propane) within a process that can be operated at a higher capacity for which it is designed.

In processes in which the heat recovery 400 and absorbing media chiller 480 cannot practically provide the required cooling duty for the post-combustion flue gas 401, a DCC 420 can be added downstream of the heat recovery process 400. The DCC is cooled via an external evaporative cooling process 450, which can achieve lower temperatures than a dry air cooled system as evaporative cooling potential is based on the ambient wet-bulb temperature.

For facilities in which there is limited or no available external water for consumption in the evaporative cooling process 450, the treated flue gas condensate 421 can be utilized. Post-combustion flue gas 401 is typically 7-20% water by volume, which will result in water condensate when the post-combustion flue gas 401 is cooled below is water dew-point. This condensate can be treated and utilized within the cooling water system. In extreme cases, this treated flue gas condensate 421 can be the sole source of water for the cooling water system. If additional water is available, supplemental water make-up 453 can be another source of cooling water make-up.

In order to further reduce water consumption within the evaporative cooling process, an optional dry air cooling process 460 can be implemented on the cooling water return 452 to the evaporative cooling process 450. In this arrangement, the dry air cooling process 460 shifts duty away from the evaporative cooling process 450, especially under conditions where cool dry-bulb temperatures (<80° F.) exist. This arrangement can be designed to operate fully dry (no duty on evaporative cooler 450) at certain ambient conditions, and only rely on the evaporative cooling process 450 when dry-bulb temperatures exceed minimum process requirements.

For processes in which the optimal performance of the $CO_2$ absorbing media is below temperatures that can be practically achieved with an evaporative cooling process 450, an optional chilling unit 470 can added downstream of the evaporative cooling process 450 to further reduce the cooling water supply 451 temperature. In instances where the carbon capture facility is co-located with a facility with existing excess refrigeration capacity 490 (e.g. in an LNG liquefaction facility), this excess capacity can be utilized as the cooling media in the chilling unit 470.

As an additional alternative, the cooling water system can be designed such that the quenching water in the DCC 420 and the cooling water are one and the same. In this configuration, the warm quenching water is directly sent to the evaporative cooling process 450 where it is cooled and returned to the DCC 420. The quench water cooler 440 is not necessary and is removed. This configuration provides the benefit of reduced equipment count and larger approach temperatures in both the evaporative cooling process 450 and/or the optional dry air cooling process 460.

Figure 5:
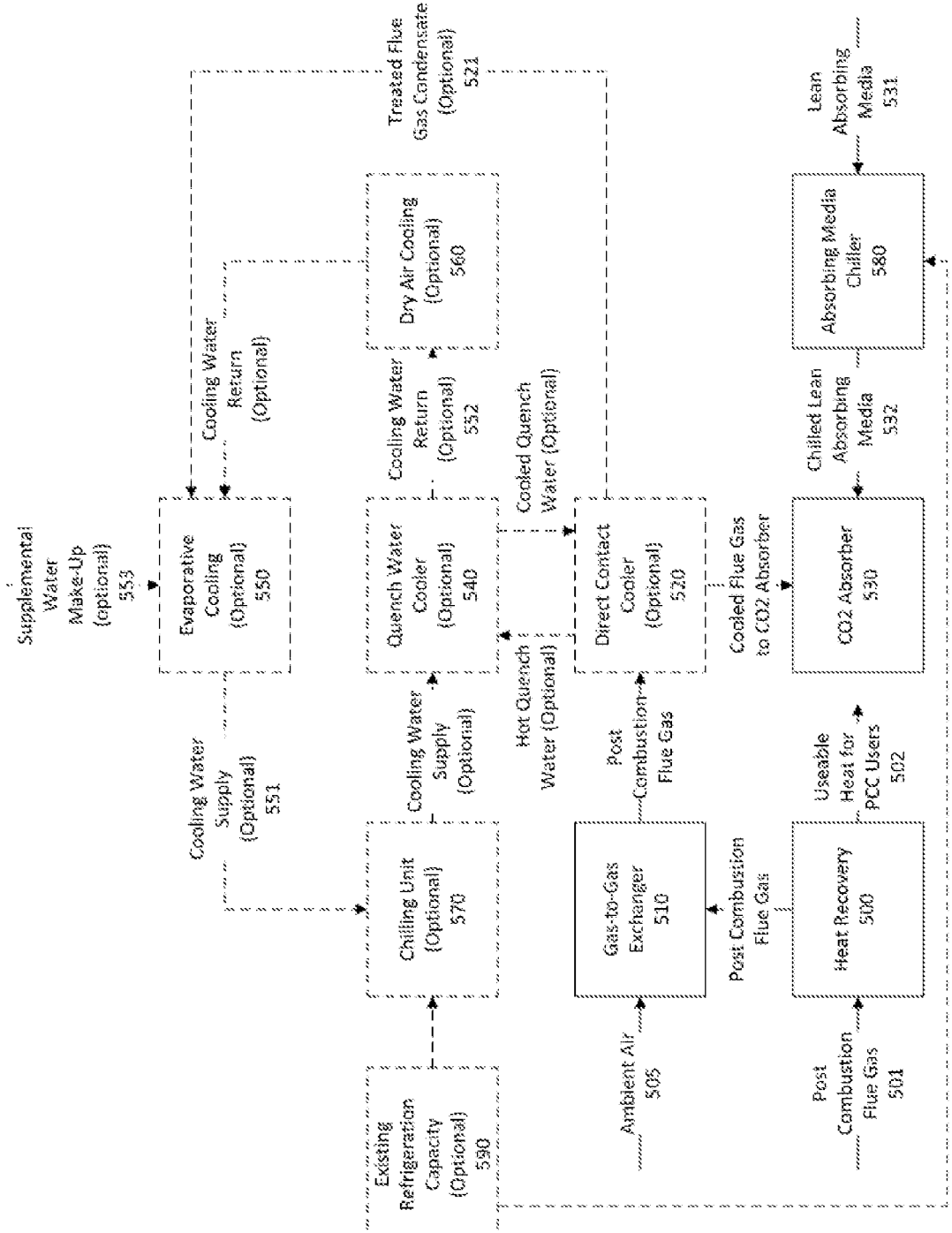
FIG. 5 illustrates a flue gas cooling process that includes a heat recovery process, gas-to-gas exchanger, quench process, and an absorbing media chiller according to an aspect of the present disclosure.

In another embodiment, as shown in FIG. 5, an absorbing media chiller 580 is added to chill the lean absorbing media 531 to meet the required operating temperature ranging from 100° F. to 200° F. of the $CO_2$ absorber 530. The absorbing media chiller 580, in combination with heat recovery 500 and a gas-to-gas exchanger 510 achieve the total cooling duty required for the post-combustion flue gas 501. This embodiment does not negatively impact the performance of the absorber 530, resulting in treated gas and $CO_2$ rich absorbing media with similar compositions to the treated gas 134 and $CO_2$ rich absorbing media 133 from prior art.

The absorbing media chiller 580 is an exchanger (e.g. shell and tube, plate, etc.) in which the absorbing media is cooled below the normal operating temperature of the absorber and below the dry-bulb temperature of the surrounding air. The cooling media in the absorbing media chiller 580 can be chilled water that is cooled via a refrigeration cycle, or the cooling media can be the refrigerant in a refrigeration cycle (e.g. propane).

In this process, higher temperatures (up to 175° F.) are permitted at the flue gas inlet of the $CO_2$ absorber, as additional flue gas cooling will occur via direct contact with the chilled lean absorbing media 532 in the $CO_2$ absorber 530. Sufficient chilling is provided such that when the absorbing media is mixed with the flue gas in the absorber, the absorbing media remains within the acceptable operating temperatures of the $CO_2$ absorber 530.

In comparison to the embodiment shown in FIG. 4, this embodiment advantageously includes the gas-to-gas exchanger 510, which serves to reduce the overall cooling duty required within the absorbing media chiller 580.

Existing refrigeration capacity 590 within a co-located facility can be used to cool the lean absorbing media 531 in the absorbing media chiller 580. Existing refrigeration capacity 590 may comprise of a refrigeration loop (e.g. Propane) within a process that can be operated at a higher capacity for which it is designed.

In some instances (e.g. water availability is not a constraint), a DCC 520 can be added downstream of the gas-to-gas exchanger 510. The DCC is cooled via an external evaporative cooling process 550, which can achieve lower temperatures than a dry air cooled system as evaporative cooling potential is based on the ambient wet-bulb temperature. Duty can be shifted from both the gas-to-gas exchanger 510 and absorbing media chiller 580 to the DCC 520.

For facilities in which there is limited or no available external water for consumption in the evaporative cooling process 550, the treated flue gas condensate 521 can be utilized. Post-combustion flue gas 501 is typically 7-20% water by volume, which will result in water condensate when the post-combustion flue gas 501 is cooled below is water dew-point. This condensate can be treated and utilized within the cooling water system. In extreme cases, this treated flue gas condensate 521 can be the sole source of water for the cooling water system. If additional water is available, supplemental water make-up 553 can be another source of cooling water make-up.

In order to further reduce water consumption within the evaporative cooling process, an optional dry air cooling process 560 can be implemented on the cooling water return 552 to the evaporative cooling process 550. In this arrangement, the dry air cooling process 560 shifts duty away from the evaporative cooling process 550, especially under conditions where cool dry-bulb temperatures (<80° F.) exist. This arrangement can be designed to operate fully dry (no duty on evaporative cooler 550) at certain ambient conditions, and only rely on the evaporative cooling process 550 when dry-bulb temperatures exceed minimum process requirements.

For processes in which the optimal performance of the $CO_2$ absorbing media is below temperatures that can be practically achieved with an evaporative cooling process 550, an optional chilling unit 570 can added downstream of the evaporative cooling process 550 to further reduce the cooling water supply 551 temperature. In instances where the carbon capture facility is co-located with a facility with existing excess refrigeration capacity 590 (e.g. in an LNG liquefaction facility), this excess capacity can be utilized as the cooling media in the chilling unit 570.

As an additional alternative, the cooling water system can be designed such that the quenching water in the DCC 520 and the cooling water are one and the same. In this configuration, the warm quenching water is directly sent to the evaporative cooling process 550 where it is cooled and returned to the DCC 520. The quench water cooler 540 is not necessary and is removed. This configuration provides the benefit of reduced equipment count and larger approach temperatures in both the evaporative cooling process 550 and/or the optional dry air cooling process 560.

The acid gas dew point of the post-combustion flue gas is a critical consideration when selecting appropriate cooling applications. In processes where the temperature of the post-combustion flue gas entering the $CO_2$ absorber is below the acid gas dew point temperature of the flue gas stream (based on composition, typically 300° F.-150° F.), gas-to-gas exchangers can be operated such that the flue gas outlet temperature of the gas-to-gas exchanger is maintained above the acid gas dew point temperature, with the remaining flue gas cooling being performed via direct contact cooling.

Alternatively, gas-to-gas exchangers with highly corrosion resistant materials of construction (e.g. PTFE, glass, etc.) can be utilized to cool flue gas to temperatures below its acid gas dew point temperature.

Based on project economics and design conditions such as flue gas flow rate and the temperature requirement of the flue gas entering the absorber, it may be viable to use a highly corrosion resistant gas-to-gas exchanger for the entire cooling duty, eliminating the requirement for the direct contact cooling process. Alternatively, if the material cost for a highly corrosion resistant gas-to-gas exchanger makes it undesirable to have a single gas-to-gas exchanger perform the entire cooling duty, a highly corrosion resistant gas-to-gas exchanger can be used in series downstream of another less corrosion resistant gas-to-gas exchanger. In this scheme, the flue gas outlet temperature of the first gas-to-gas exchanger would be maintained above the acid gas dew point of the flue gas stream (300° F.-150° F.), allowing for less costly materials of construction. The second, more highly corrosion resistant gas-to-gas exchanger, would be utilized to reduce the flue gas temperature through its acid gas dew point to the required flue gas temperature at the absorber inlet.

In processes where the acid gas dew point of the flue gas is between 100° F. to 200° F., chilled amine can be used as a direct contact cooling media in the absorber or quench to cool the flue gas past its acid gas dew point. Condensed acids are likely to form salts with amine based and ammonia based absorbents which are typically removed via absorbent reclamation.

Clean fuel gas (e.g. treated natural gas) may have low contaminant (e.g. sulfur, chlorine, bromine, etc.) concentrations (i.e. less than 1 ppm) as opposed to fuels such as coal or biomass which may have much higher contaminant concentrations (i.e. more than 1000 ppm). In processes burning clean fuels, acid gas dew point concerned are abated, and appropriate material of construction selection (e.g. stainless steel) may be sufficient to prevent acid gas dew point related corrosion.

Additionally, the risk of acid gas condensation in the flue gas flow path can be obviated (e.g. gas-to-gas exchangers, ducting, blowers, quench towers, absorbers, etc.) by processing the fuel gas using commercially available technologies to remove such acid forming contaminants to levels such that the flue gas could be cooled through the dew point.

This invention is claimed as follows:

1. A two-stage flue gas cooling process comprising;
cooling a flue gas in a first stage by a gas-to-gas plate heat exchanger, wherein the gas-to-gas plate heat exchanger utilizes air as a cooling media;
cooling the flue gas in a second stage by direct contact with a quenching water in a direct contact cooler, wherein the quenching water is cooled by a cooling water in a quench water cooler;
cooling the cooling water by an evaporative cooling process; and
deriving a water make-up supply for the cooling water from a treated flue gas condensate from the direct contact cooler.

2. The two-stage flue gas cooling process of claim 1, further comprising deriving a supplemental water make-up supply for the cooling water.

3. The two-stage flue gas cooling process of claim 1, further comprising recovering a useable heat for use in a post-combustion capture unit by a waste heat recovery unit upstream of the first stage.

4. The two-stage flue gas cooling process of claim 1 further comprising cooling the cooling water downstream of the evaporative cooling process using a chilling unit.

5. The flue gas cooling process of claim 4 comprising cooling the cooling water in the chilling unit using existing refrigeration capacity within a co-located facility.

6. The two-stage flue gas cooling process of claim 1 further comprising cooling the cooling water through a dry air-cooling process upstream of the evaporative cooling process.

7. The two-stage flue gas cooling process of claim 1 wherein the quenching water and the cooling water are the same process stream.

8. A flue gas cooling process comprising:
cooling a flue gas by a waste heat recovery unit to recover a useable heat for use in a post-combustion capture unit; and
cooling the flue gas by a gas-to-gas plate heat exchanger, wherein the gas-to-gas plate heat exchanger utilizes air as a cooling media.

9. The flue gas cooling process of claim 8 further comprising cooling the flue gas by direct contact with a quenching water in a direct contact cooler, wherein the quenching water is cooled by a cooling water in a quench water cooler; and
cooling the cooling water by an evaporative cooling process, wherein a water make-up supply for the cooling water is at least partially derived from a treated flue gas condensate from the direct contact cooler.

10. The flue gas cooling process of claim 9, further comprising cooling the cooling water downstream of the evaporative cooling process using a chilling unit.

11. The flue gas cooling process of claim 10 comprising cooling the cooling water in the chilling unit using existing refrigeration capacity within a co-located facility.

12. The flue gas cooling process of claim 9 further comprising cooling the cooling water using a dry air cooling process upstream of the evaporative cooling process.

13. The flue gas cooling process of claim 9 wherein the quenching water and the cooling water are the same process stream.

14. A flue gas cooling process comprising:
cooling a flue gas by a waste heat recovery unit to recover a useable heat for use in a post-combustion capture unit; and
further cooling the flue gas by contact with a lean absorbing media in a $CO_2$ absorber, wherein the lean absorbing media is chilled in an absorbing media chiller prior to entry into the $CO_2$ absorber.

15. The flue gas cooling process of claim 14 further comprising;
cooling the flue gas downstream of the waste heat recovery unit by direct contact with a quenching water in a direct contact cooler, wherein the quenching water is cooled by a cooling water in a quench water cooler; and
cooling the cooling water by an evaporative cooling process, wherein a water make-up supply for the cooling water is at least partially derived from a treated flue gas condensate from the direct contact cooler.

16. The flue gas cooling process of claim 15, further comprising cooling the cooling water downstream of the evaporative cooling process using a chilling unit.

17. The flue gas cooling process of claim 16 comprising cooling the cooling water in the chilling unit using existing refrigeration capacity within a co-located facility.

18. The flue gas cooling process of claim 15 further comprising cooling the cooling water by a dry air cooling process upstream of the evaporative cooling process.

19. The flue gas cooling process of claim 15 wherein the quenching water and the cooling water are the same process stream.

20. The flue gas cooling process of claim 14 comprising cooling the lean absorbing media in the absorbing media chiller using an existing refrigeration capacity within a co-located facility.

21. A flue gas cooling process comprising:
cooling a flue gas by a waste heat recovery unit to recover a useable heat for use in a post-combustion capture unit;
cooling the flue gas by a gas-to-gas plate heat exchanger, wherein the gas-to-gas plate heat exchanger utilizes air as a cooling media; and
cooling the flue gas by contact with a lean absorbing media in a $CO_2$ absorber, wherein the lean absorbing media is chilled in an absorbing media chiller prior to entry into the $CO_2$ absorber.

22. The flue gas cooling process of claim 21 further comprising;
cooling the flue gas downstream of the gas-to-gas plate heat exchanger by direct contact with a quenching water in a direct contact cooler, wherein the quenching water is cooled by a cooling water in a quench water cooler; and
cooling the cooling water by an evaporative cooling process, wherein a water make-up supply for the cooling water is at least partially derived from a treated flue gas condensate from the direct contact cooler.

23. The flue gas cooling process of claim 22, further comprising cooling the cooling water downstream of the evaporative cooling process using a chilling unit.

24. The flue gas cooling process of claim 23 comprising cooling the cooling water in the chilling unit using existing refrigeration capacity within a co-located facility.

25. The flue gas cooling process of claim 22 further comprising cooling the cooling water by a dry air cooling process upstream of the evaporative cooling process.

26. The flue gas cooling process of claim 22 wherein the quenching water and the cooling water are the same process stream.

27. The flue gas cooling process of claim 21 comprising cooling the absorbing media in the absorbing media chiller using existing refrigeration capacity within a co-located facility.

* * * * *